(12) United States Patent
Hamilton (10) Patent No.: US 7,664,791 B1
(45) Date of Patent: Feb. 16, 2010

(54) CONCURRENT CREATION OF PERSISTENT POINT-IN-TIME IMAGES OF MULTIPLE INDEPENDENT FILE SYSTEMS

(75) Inventor: Eric C. Hamilton, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 411 days.

(21) Appl. No.: 11/260,653

(22) Filed: Oct. 26, 2005

(51) Int. Cl.
*G06F 12/00* (2006.01)
*G06F 17/30* (2006.01)

(52) U.S. Cl. .................................................. 707/202
(58) Field of Classification Search ................. 707/200, 707/204
See application file for complete search history.

(56) References Cited

U.S. PATENT DOCUMENTS

| | | | |
|---|---|---|---|
| 5,819,292 A | 10/1998 | Hitz et al. | |
| 5,991,542 A * | 11/1999 | Han et al. | 717/167 |
| 6,212,531 B1 * | 4/2001 | Blea et al. | 707/204 |
| 6,272,611 B1 * | 8/2001 | Wu | 711/173 |
| 6,289,356 B1 * | 9/2001 | Hitz et al. | 707/201 |
| 6,895,413 B2 * | 5/2005 | Edwards | 707/201 |
| 7,107,385 B2 * | 9/2006 | Rajan et al. | 711/4 |
| 7,328,318 B1 * | 2/2008 | Burriss et al. | 711/161 |
| 2002/0083037 A1 * | 6/2002 | Lewis et al. | 707/1 |
| 2003/0229656 A1 * | 12/2003 | Hitz et al. | 707/205 |
| 2004/0139273 A1 * | 7/2004 | Doucette et al. | 711/100 |
| 2006/0236047 A1 * | 10/2006 | Shitomi | 711/162 |
| 2007/0180257 A1 * | 8/2007 | Bae et al. | 713/182 |

OTHER PUBLICATIONS

"Snapshot™ Technology," www.netapp.com, Oct. 11, 2004, http://web.archive.org/web/20041011104545/http://www.netapp.com/products/snapshot.html.*
"Data ONTAP™ Software," www.netapp.com, Oct. 12, 2004, http://web.archive.org/web/20041012081308/http://www.netapp.com/products/filer/ontap.html.*
"ZFS: the last word in file systems," www.sun.com, Sep. 14, 2004, http://www.sun.com/2004-0914/feature/.*

* cited by examiner

*Primary Examiner*—James Trujillo
*Assistant Examiner*—Jeffrey A Burke
(74) *Attorney, Agent, or Firm*—Perkins Coie LLP (57) ABSTRACT

A storage server maintains multiple file systems in a storage subsystem. A read-only, persistent, point-in-time image of all of the file systems is generated in one atomic operation.

20 Claims, 7 Drawing Sheets

CONCURRENT CREATION OF PERSISTENT POINT-IN-TIME IMAGES OF MULTIPLE INDEPENDENT FILE SYSTEMS

FIELD OF THE INVENTION

At least one embodiment of the present invention pertains to data storage systems, and more particularly, to a technique for concurrently creating persistent point-in-time images of multiple independent file systems.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In conventional file servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units, such as blocks or LUNs.

In older file servers, there was a fixed, one-to-one relationship between a volume and its containing aggregate, i.e., each volume was exactly coextensive with one aggregate. Consequently, there was a fixed relationship between each volume and the disks that are associated with it. This fixed relationship meant that each volume had exclusive control over the disks that are associated with the volume. Only the volume associated with the disk could read and/or write to the disk. Unused space within the disks associated with the volume could not be used by another volume. Thus, even if a volume was only using a fraction of the space on its associated disks, the unused space was reserved for the exclusive use of the volume.

To overcome these limitations and other limitations of traditional volumes, a technology called flexible volumes was developed by NetApp® and is available in NetApp® Filers as a feature of the Data ONTAP® storage operating system. A flexible volume is analogous to a traditional volume, in that it is managed as a file system; but unlike a traditional volume, a flexible volume is treated separately from the underlying physical storage that contains the associated data. A "flexible volume" is, therefore, a set of stored data associated with one or more mass storage devices, such as disks, which obtains its storage from an aggregate, and which is managed as an independent administrative unit, such as a single file system, but which is flexibly associated with the underlying physical storage.

Flexible volumes allow the boundaries between aggregates and volumes to be flexible, such that there does not have to be a one-to-one relationship between a flexible volume and an aggregate. An aggregate can contain multiple flexible volumes. Hence, flexible volumes can be very flexibly associated with the underlying physical storage block characteristics. Further, to help reduce the amount of wasted storage space, any free data block in an aggregate can be used by any flexible volume in the aggregate. A flexible volume can be grown or shrunk in size. Furthermore, blocks can be committed to flexible volumes on-the-fly from available storage.

One feature which is useful to have in a storage server is the ability to create a read-only, persistent, point-in-time image (RPPI) of a data set, such as a volume or a LUN, including its metadata. This capability allows the exact state of the data set to be restored from the RPPI in the event of, for example, a catastrophic failure of the storage system or data corruption. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™ or SnapManager® for Microsoft® Exchange software, both made by NetApp®. Unlike other RPPI implementations, NetApp Snapshots do not require duplication of data blocks in the active file system, because the active file system can include pointers to data blocks in a Snapshot, for any blocks that have not been modified since the Snapshot was created.

One problem with the known prior art is that there is no way to create an RPPI of multiple volumes in a single atomic operation. Consequently, if an administrator wanted to acquire an RPPI of all volumes stored by a storage server (or at east more than one volume) at a given point in time, he would have to initiate or program a separate RPPI operation for each volume. That is because each of the volumes is designed as an independent, separately managed set of data. Having to initiate or program a separate RPPI operation for each volume can be time-consuming and burdensome, since there can be many volumes maintained by a given storage server.

SUMMARY OF THE INVENTION

The present invention includes a method in which multiple file systems are maintained in a storage subsystem, and a read-only, persistent, point-in-time image of the file systems is generated in one atomic operation.

The present invention further includes a system and apparatus to perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for creating an RPPI of multiple independent file systems are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
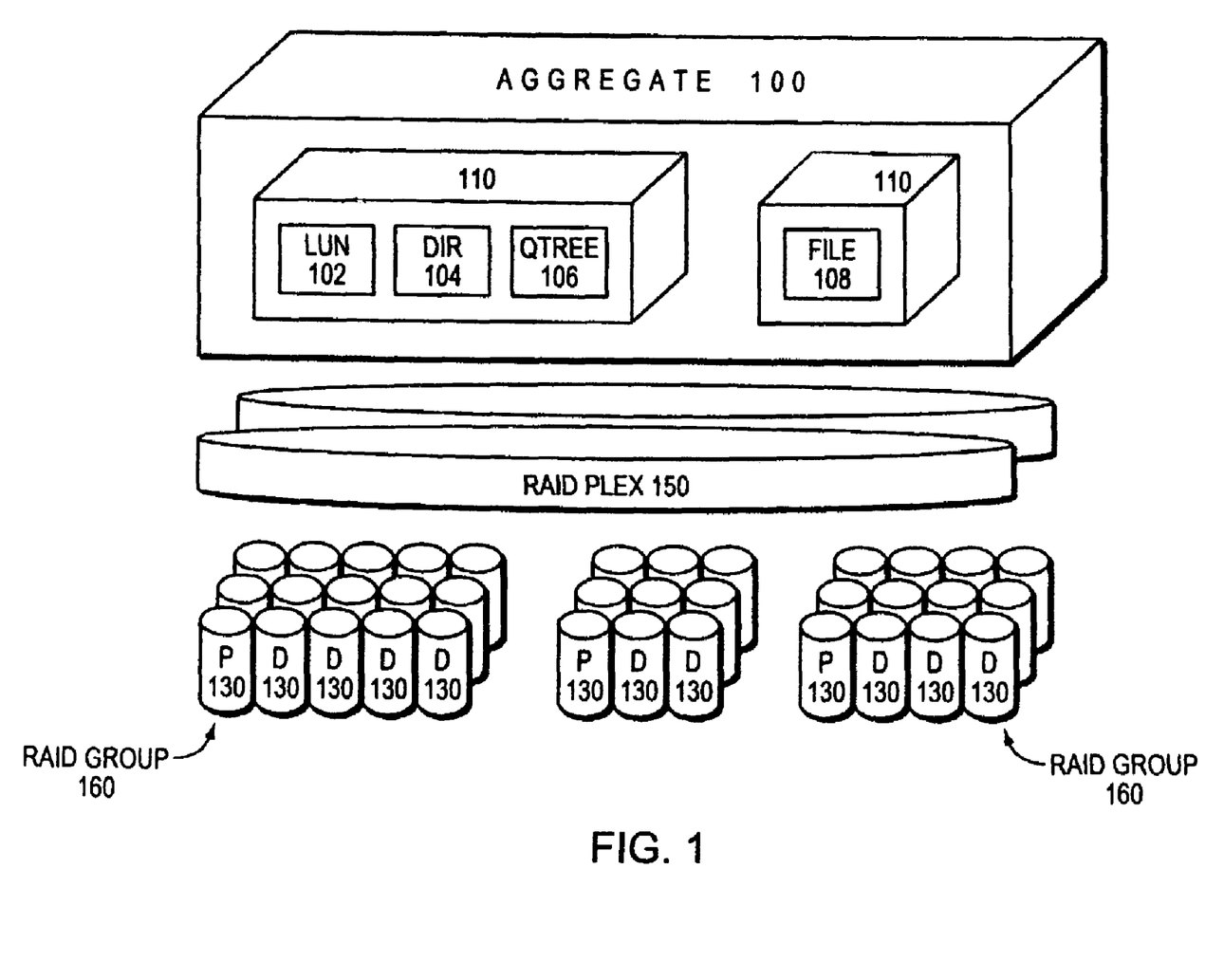
FIG. 1 is a schematic block diagram of an aggregate.

FIG. 1 illustrates an aggregate 100 of storage, such as may be implemented in a storage system in connection with the technique being introduced here. The aggregate 100 is the underlying physical volume for a plurality of flexible volumes 110. Each flexible volume 110 can include named logical unit numbers (LUNs) 102, directories 104, quota trees ("qtrees") 106, and files 108. A qtree is a special type of directory that acts as a "soft" partition, i.e., the storage used by the qtrees is not limited by space boundaries.

The aggregate 100 is layered on top of the RAID system, which is represented by at least one RAID plex 150 (depending upon whether the storage configuration is mirrored), wherein each plex 150 comprises at least one RAID group 160. Each RAID group further comprises a number of mass storage devices (e.g., disks) 130, such as one or more data (D) disks and at least one (P) parity disk.

In embodiments of the invention, the aggregate 100 is represented (implemented) as a volume within the storage system, and each flexible volume is represented (implemented) as a file (referred to as a "container file") within that volume. That is, the aggregate 100 may include one or more files, wherein each file contains a flexible volume 110 and wherein the sum of the storage space consumed by flexible volumes associated with the aggregate 100 is physically less than or equal to the size of the overall physical volume.

The aggregate 100 utilizes a physical volume block number (PVBN) space that defines the storage space of blocks provided by the disks of the physical volume, and each flexible volume embedded within a file utilizes a "logical" or "virtual" volume block number (VVBN) space in order to organize those blocks as files. A PVBN, therefore, is an address of a physical block in the aggregate. A VVBN is an address of a block in a flexible volume (the same block as referenced by the corresponding PVBN), i.e., the offset of the block within the file that represents the flexible volume. Each VVBN space is an independent set of numbers that corresponds to locations within the file, which locations are then translated to disk block numbers (DBNs) on disk. Since a flexible volume 110 is also a logical volume, it has its own block allocation structures (e.g., active, space and summary maps) in its VVBN space.

Each flexible volume 110 is essentially a separate file system that is "mingled" onto a common set of storage in the aggregate 100 by the associated storage operating system. The RAID system of the associated storage operating system builds a RAID topology structure for the aggregate 100 that guides each file system when performing write allocation. The RAID system also presents a PVBN-to-DBN mapping to the file system.

Each file in the aggregate is represented in the form of a buffer tree. A buffer tree is a hierarchical metadata structure which used to store metadata about the file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. A "block" of data is a contiguous set of data of a known length starting at a particular offset value. In certain embodiments of the invention, each direct (Level 0) block is 4 Kbyte in length. However, a block could be of different sizes in other embodiments of the invention.

The root of a buffer tree is the "inode" of the file. An inode, as the term is used herein, is a metadata container which used to store metadata about the file, such as ownership of the file, access permissions for the file, file size, file type, and pointers to the highest level of indirect blocks for the file (see "buffer tree"). The inode is stored in a separate inode file.

Figure 2:
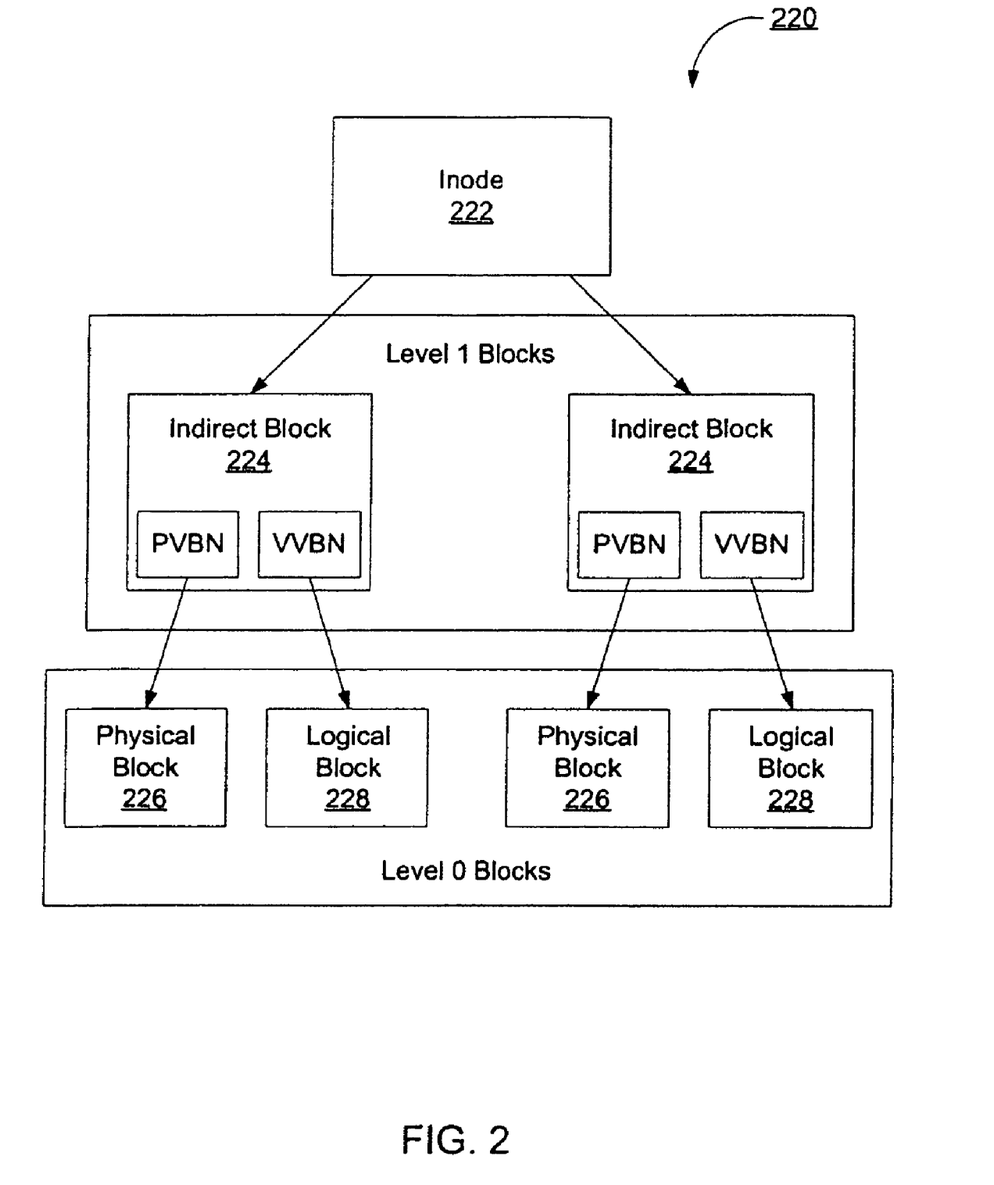
FIG. 2 is a schematic block diagram of a buffer tree of a file.

FIG. 2 shows an example of the buffer tree for a file 220 within a container file, i.e., a file within a flexible volume 110. The file 220 is assigned an inode 222, which references Level 1 (L1) indirect blocks 224. In a file within a flexible volume, each indirect block stores at least one PVBN and a corresponding VVBN for each PVBN. To simplify description, only one PVBN-VVBN pair is shown in each indirect block 224 in FIG. 2; however, a real implementation could include many PVBN-VVBN pairs in each indirect block. Each PVBN references a physical block in the aggregate itself and the corresponding VVBN references the associated logical block number in the flexible volume. The inode 222 and indirect blocks 224 in FIG. 2 are shown pointing to only two lower-level blocks each in FIG. 2, to simplify description. It is to be understood, however, that an inode and any indirect block can actually include a greater number of pointers and thus may refer to a greater number of lower-level blocks.

As mentioned above, each flexible volume is represented in the storage system as a file, referred to as a "container file", which has a buffer tree that can have a structure similar to that shown in FIG. 2. Like any other file, the container file has an inode, which is indicated as flexible volume type, and which is assigned an inode number equal to a virtual volume id (VVID). The L1 indirect blocks of the container file together may be referred to as a container map.

The container file is typically one large, sparse virtual disk, which contains all blocks owned by its flexible volume. A VVBN in a container file also represents the offset (i.e., the file block number (FBN)) of the block within the container map. A block referenced by a given VVBN, say VVBN X, in the flexible volume 110 can be found at FBN X in the container file. For example, VVBN 2000 in a flexible volume 110 can be found at FBN 2000 in its container file 200. Since each flexible volume 110 in the aggregate 100 has its own distinct VVBN space, one container file in the aggregate may have an FBN 2000 that is different from FBN 2000 in another container file in the aggregate.

Figure 3:
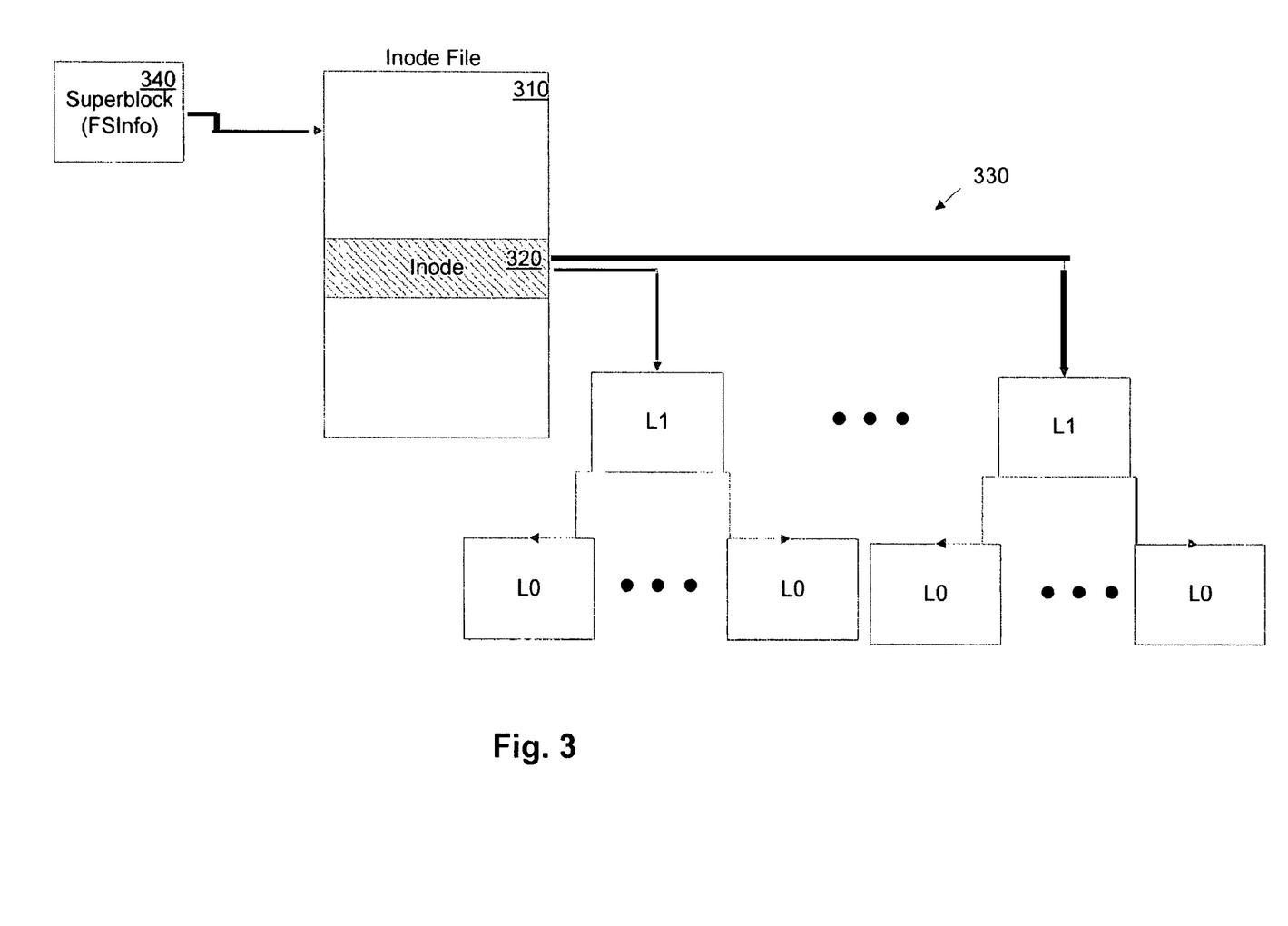
FIG. 3 is a schematic block diagram showing the relationship between a superblock, an inode file, and a buffer tree.

As shown in FIG. 3, for each volume stored by the storage system, the inodes of each file in that volume are stored in a separate inode file 310. A separate inode file 310 is maintained for each volume in the storage system. Each inode 320 in an inode file 310 is the root of the buffer tree 330 of a corresponding file. The location of the inode file 310 for each volume is stored in a superblock (also called "fsinfo block") 340 associated with that volume. The superblock 340 is a metadata container that contains metatdata for the volume as a whole rather than for individual files within the volume.

The aggregate 100 is also represented in the storage system as a volume. Consequently, the aggregate is assigned its own superblock, which contains metadata of the aggregate and points to the inode file for the aggregate. The inode file for the aggregate contains the inodes of all of the flexible volumes within the aggregate, or more precisely, the inodes of all of the container files within the aggregate. Hence, each volume has a structure such as shown in FIG. 3, and the aggregate itself also has a structure such as shown in FIG. 3. As such, the storage system implements a nesting of file systems, where the aggregate is one file system and each volume within the aggregate is also a file system.

As a result of this storage system structure and functionality, every actual data block (Level 0) within the aggregate is referenced by two separate buffer trees, i.e., the buffer tree of the file which contains the block and the buffer tree of the container file of the volume which contains the block. Consequently, from the superblock of the aggregate, one can locate any Level 0 data block of any file within any volume within the aggregate.

The above-described structure and functionality are advantageous for purposes of creating RPPIs. In particular, they allow an RPPI to be created of all volumes (file systems) within an aggregate in one atomic operation, by simply creating an RPPI of the aggregate. This is possible because the aggregate (including all of the volumes, files and metadata that it includes) is represented by the file system software as a self-contained administrative unit, i.e., as a volume. Therefore, an RPPI of the aggregate includes an RPPI of every volume within that aggregate.

This technique is particularly advantageous when used in conjunction with file system software that implements a write-out-of-place approach (sometimes called "write anywhere") and an RPPI technique which does not require duplication of data blocks to create an RPPI. In a write-out-of-place file system, whenever a data block is modified, it is written to a new physical location on disk. This is in contrast with a write-in-place approach, where a data block, when modified, is written in its modified form back to the same physical location on disk. An example of file system software that implements write-out-of-place is the WAFL® file system software included in the Data ONTAP® storage operating system of NetApp®.

An example of an RPPI technique which does not require duplication of data blocks to create an RPPI is described in U.S. Pat. No. 5,819,292, which is incorporated herein by reference, and which is assigned to NetApp®. The described technique of creating an RPPI (e.g., a Snapshot™) does not require duplication of data blocks in the active file system, because the active file system can include pointers to data blocks in an RPPI, for any blocks that have not been modified since the RPPI was created. (The term "Snapshot" is used in this document without derogation of Network Appliance, Inc.'s trademark rights.) Among other advantages, this technique allows an RPPI to be created quickly, helps to reduce consumption of storage space due to RPPIs, and reduces the need to repeatedly update data block pointers as required in some prior art RPPI techniques.

Figure 4A:
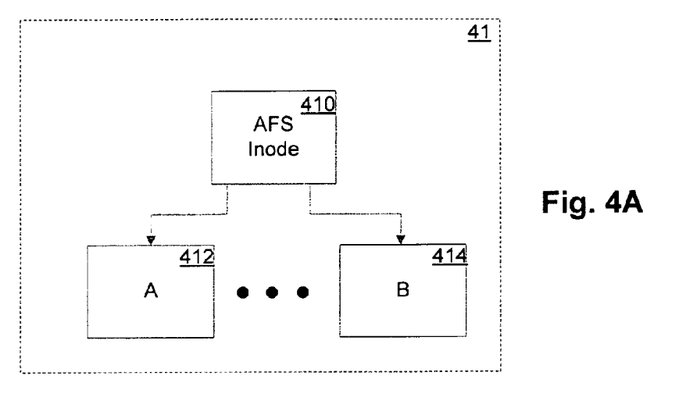
FIGS. 4A, 4B and 4C illustrate a volume and how an RPPI of the volume is created.
Figure 4B:
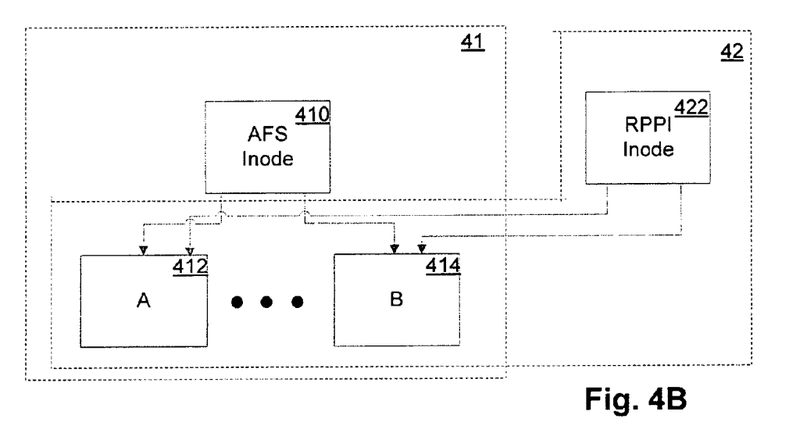
Figure 4C:
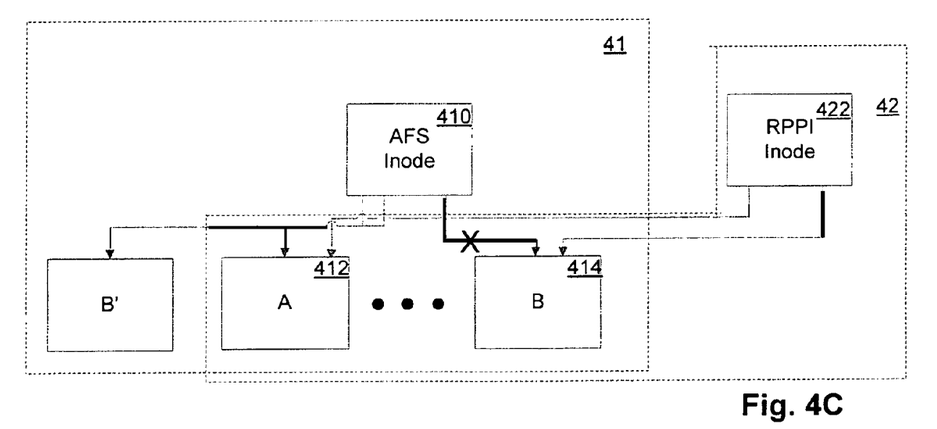

FIGS. 4A through 4C further illustrate this technique. FIG. 4A shows the buffer tree of a very simple volume 41, before an RPPI of the volume is created, where levels of indirection have been removed to facilitate description. To distinguish the volume 41 from an RPPI, the volume 41 is henceforth referred to as the "active" volume or active file system (as opposed to an RPPI, which by definition is not "active"). The active volume 41 is comprised of blocks 412 and 414, which are referenced by the active file system (AFS) inode 410 of the volume 41. The inode AFS 410 is, in turn, stored in the inode file (not shown) of the volume 41, which is locatable through the superblock (fsinfo block) of the volume. The illustrated blocks 412 and 414 represent all blocks in the volume 41, including direct blocks and indirect blocks. Though only two blocks 412 and 414 are shown, each block may point to other blocks.

FIG. 4B shows the creation of an RPPI of volume 41. An RPPI 42 of the entire volume 41 is created by simply copying the AFS inode 410 of the volume 41 as the RPPI inode 422. The new RPPI inode 422 points to the highest level of indirect blocks referenced by the AFS inode 410 of the volume 41 at the time the RPPI was created. Because the inode 410 is copied, no other blocks need to be duplicated. The copied inode, i.e., RPPI inode 422, is then copied into the inode file of the volume (and identified as an RPPI inode), which dirties a block in the inode file. For an inode file comprised of one or more levels of indirection, each indirect block in the chain is in turn dirtied. This process of dirtying blocks propagates through all the levels of indirection in the inode file. A new superblock (not shown) is also created for the RPPI. The new superblock points to the inode file of the volume.

FIG. 4C shows the active volume 41 and the RPPI 42 when a change to the active volume 41 subsequently occurs after the RPPI 42 is created. As illustrated, block 414 comprising data "B" is modified after the RPPI 42 was created (in FIG. 4B). Therefore, a new block 424 containing data "B-prime" is allocated for the active volume 41. Thus, the active volume 41 now comprises blocks 412 and 424 but no longer contains block 414 containing data "B". However, block 414 containing data "B" is not overwritten, because the file system software implements write-out-of-place and therefore does not overwrite blocks on disk. The block 414 is protected against being overwritten by a corresponding bit being set in a block map entry for block 414. Therefore, the RPPI 42 still includes unmodified block 414 as well as block 412.

It will be recognized that an RPPI of an entire aggregate, implemented as described above, can be created in essentially the same way as an RPPI of a volume.

With respect to the above-described nesting of file systems, combining this RPPI technique with the write-out-of-place file system approach is advantageous, because when a data block of a file within a volume is modified after an RPPI of the volume has been created, all of the indirect blocks in the file and in the container file of the volume will remain correct in the RPPI. The indirect blocks in the RPPI do not need to be updated when a corresponding block in the active file system is modified.

Figure 5:
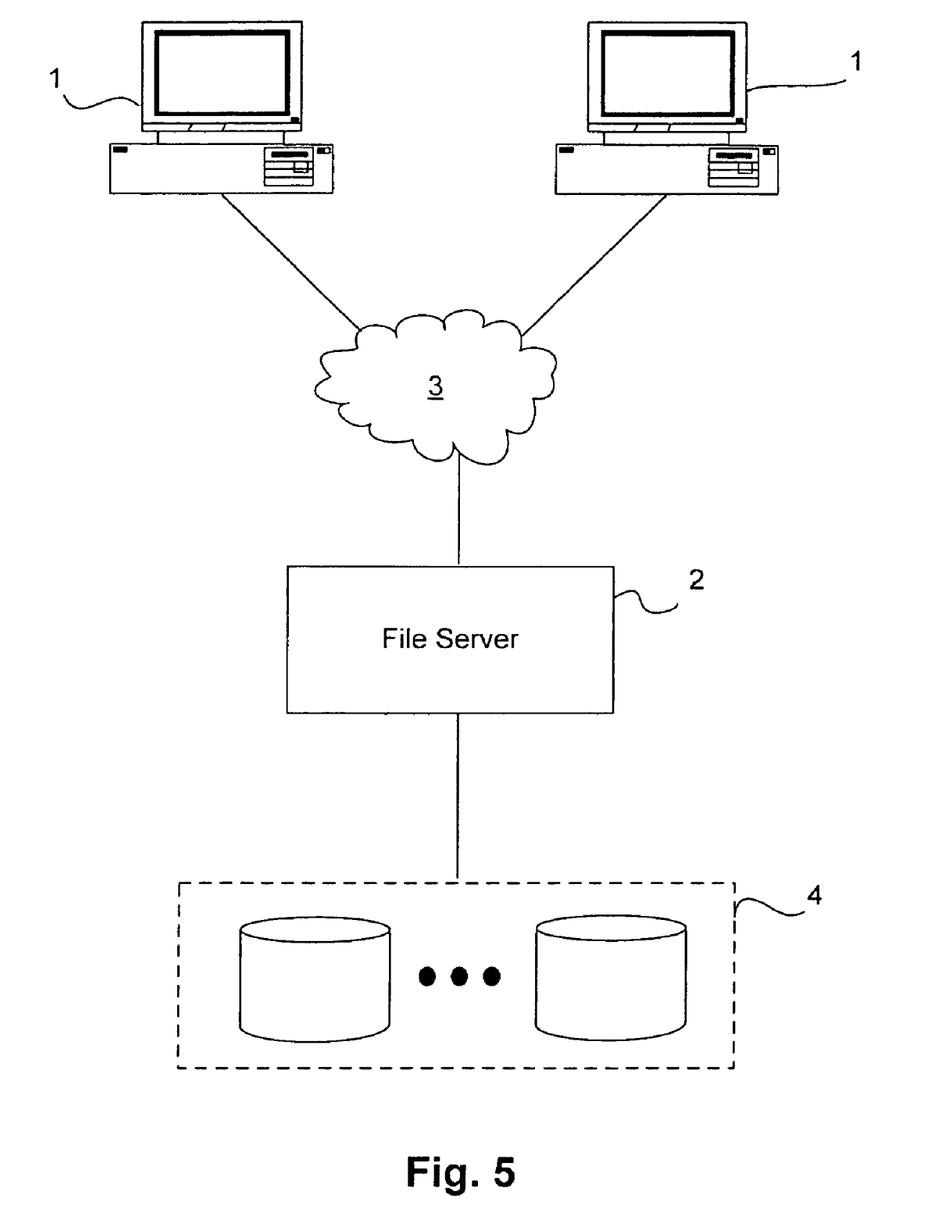
FIG. 5 illustrates a network environment that includes a storage server and clients.

FIG. 5 illustrates an example of a network environment in which the above-described techniques can be implemented. The network environment of FIG. 5 includes a storage server 2 coupled locally to a storage subsystem 4 that includes set of mass storage devices, and to a set of clients 1 through an interconnect 3. The above-described techniques for creating an RPPI of an aggregate an its included volumes can be implemented in the storage server 2.

The storage server 2 receives various read and write requests from the clients 1 and accesses the storage subsystem 4 to service those requests. Each of the clients 1 may be, for example, a conventional personal computer (PC), workstation, or the like. The mass storage devices in storage subsystem 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The storage subsystem 4 may be organized into one or more groups of Redundant Array of Independent Disks (RAID).

The storage server 2 may be, for example, a file server, or "filer", such as may be used in a NAS environment. Alternatively, the storage server may provide clients with block-level access to stored data, such as in SAN environment. Or, the storage server 2 may be capable of operating in both modes. The storage server 2 can implement one or more of various different protocols, such as common Internet file system (CIFS), network file system (NFS), hypertext transport protocol (HTTP), simple network management protocol (SNMP), transfer control protocol/Internet protocol (TCP/IP), etc., and can selectively use these protocols as needed.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

Figure 6:
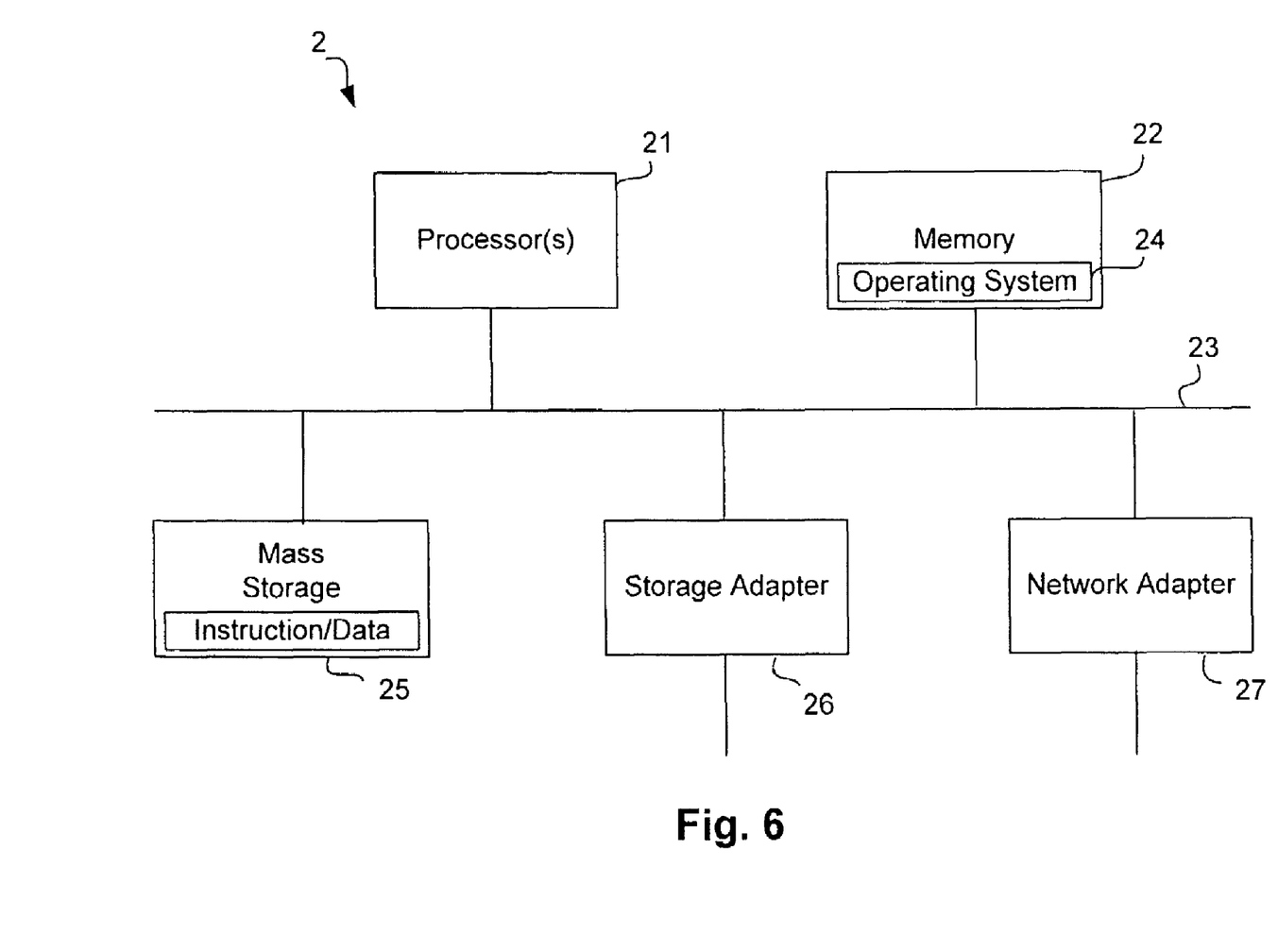
FIG. 6 is a block diagram of a storage server.

FIG. 6 is a high-level block diagram of the storage server 2 of FIG. 2, according to certain embodiments of the invention. Certain standard and well-known components which are not germane to the present invention are not shown. The storage server 2 includes one or more processors 21 coupled to a bus system 23.

The bus system 23 in FIG. 6 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 43. The memory 22 represents any form of random access memory (RAM), read-only memory (ROM), flash memory, or a combination thereof. Memory 22 stores, among other things, the operating system 25 of the storage server 2, in which the techniques introduced here can be implemented.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the storage server 2 to access the storage subsystem 4 and may be, for example, a Fibre Channel adapter or a SCSI adapter. The network adapter 28 provides the storage server 2 with the ability to communicate with remote devices such as the clients 1 over a network and may be, for example, an Ethernet adapter or a Fibre Channel adapter.

Memory 22 and mass storage device 26 store software instructions and/or data, which may include instructions and/or data used to implement the techniques introduced here. These instructions and/or data may be implemented as part of the operating system 24 of the storage server 2.

Figure 7:
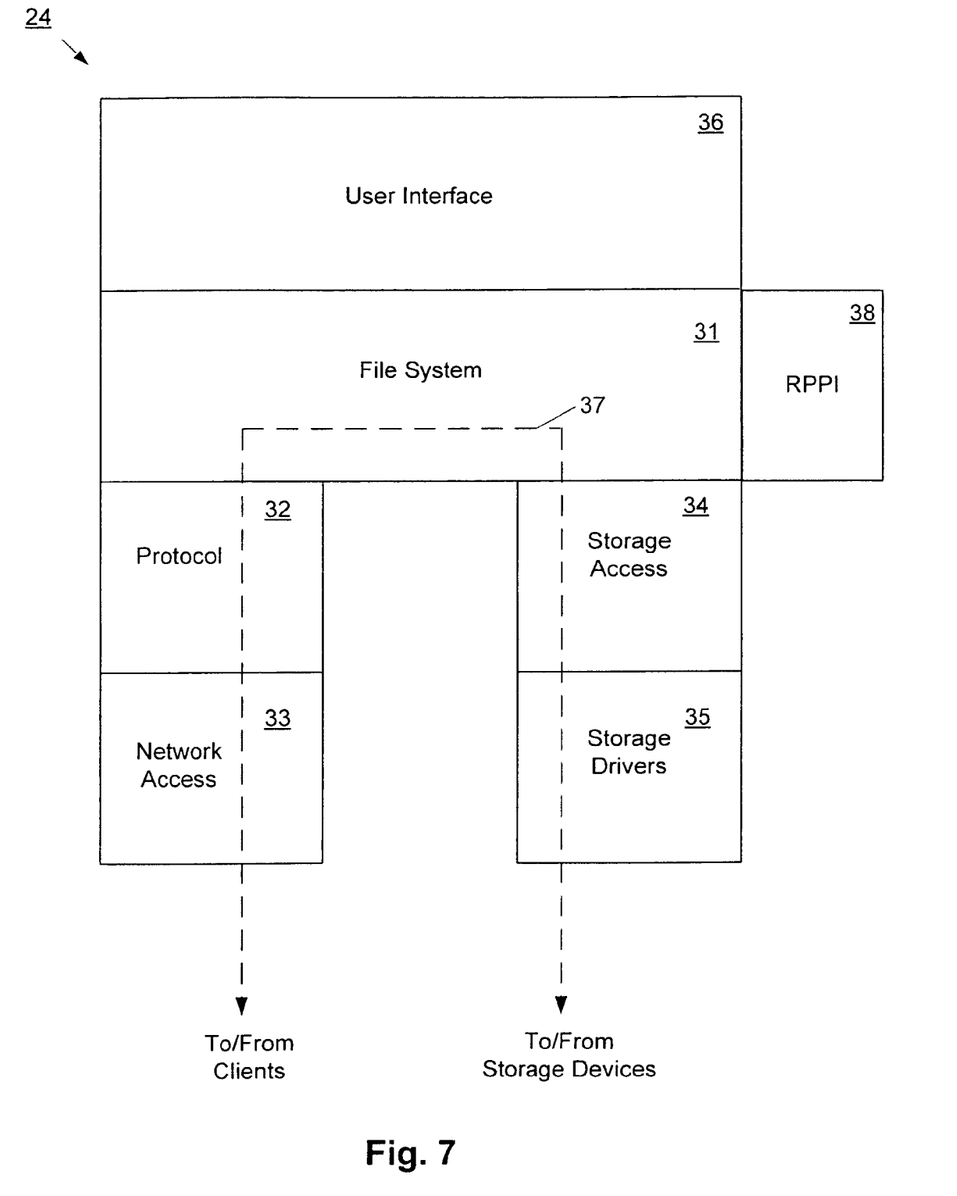
FIG. 7 illustrates the operating system of a storage server.

A shown in FIG. 7, the operating system 24 of the storage server 2 can include several modules, or layers. These layers include a file system layer 31. The file system layer 31 is an application-level programmatic entity which imposes a structure (e.g. hierarchical) on volumes, files, directories and/or other data containers stored and/or managed by a storage server 2, and which services read/write requests from clients of the storage server. An example of a file system layer which has this functionality is the WAFL® file system software that is part of the Data ONTAP® storage operating system from NetApp®.

Logically under the file system layer 31, the operating system 24 also includes a network layer 32 and an associated network media access layer 33, to allow the storage server 2 to communicate over a network (e.g., with clients 1). The network 32 layer implements various protocols, such as NFS, CIFS, HTTP, SNMP, and TCP/IP. The network media access layer 33 includes one or more drivers which implement one or more protocols to communicate over the interconnect 3, such as Ethernet or Fibre Channel. Also logically under the file system layer 31, the operating system 24 includes a storage access layer 34 and an associated storage driver layer 35, to allow the storage server 2 to communicate with the storage subsystem 4. The storage access layer 34 implements a storage redundancy protocol, such as RAID-4 or RAID-5, while the storage driver layer 35 implements a lower-level storage device access protocol, such as Fibre Channel or SCSI. Reference numeral 37 in FIG. 7 shows the data access path through the operating system 24, associated with servicing read and write requests from clients.

The operating system 24 may also include an RPPI layer 38, which interfaces with the file system layer 31 and external RPPI client software, to allow creation of RPPIs and restoration of data from RPPIs. The operating system 24 may further include a user interface layer 36, which implements a graphical user interface (GUI) and/or a command line interface (CLI), for example, such as for purposes of administrative access to the storage server 2.

Thus, a method and apparatus for creating an RPPI of multiple independent file systems have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    maintaining a plurality of storage volumes in a storage aggregate of a storage subsystem;
    maintaining, in the storage aggregate, an independent file system for each of the plurality of storage volumes, wherein each independent file system includes a plurality of files;
    representing each independent file system with a buffer tree, each said buffer tree having as its root an inode;
    maintaining an inode file comprising the inodes associated with the plurality of buffer trees; and
    storing a reference to the inode file in a superblock; and
    generating a persistent, point-in-time image (PPI) of the storage aggregate by creating a copy of the superblock, wherein the generation of the PPI of the storage aggregate causes a PPI to be automatically generated for each of the plurality of storage volumes maintained in the storage aggregate.

2. A method as recited in claim 1, further comprising:
    servicing read requests and write requests from a plurality of clients, directed to data stored in the storage subsystem.

3. A method as recited in claim 1, wherein a file system of the plurality of file systems is a flexible volume.

4. A method as recited in claim 1, further comprising:
    representing the storage aggregate as a volume within the storage subsystem.

5. A method as recited in claim 4, further comprising:
    representing the file system as a container file within the volume which represents the storage aggregate.

6. A method as recited in claim 5, wherein generating the PPI of the plurality of file systems in one atomic operation is performed by generating a PPI of the storage aggregate.

7. A method of operating a storage server, the method, comprising:
    maintaining an aggregate of storage;
    representing the aggregate as a volume;
    defining a plurality of flexible volumes within the aggregate, including representing a flexible volume of the plurality of flexible volumes as a container file, wherein each of the plurality of flexible volumes is an independent file system within the aggregate;
    storing an inode for the container file associated with the flexible volume, wherein the inode includes metadata of the flexible volume, and wherein, the inode is the root of a buffer tree of the flexible volume;
    creating a superblock for the volume, wherein the superblock includes metadata of the volume and a pointer to an inode file that comprises a plurality of inodes associated with the plurality of flexible volumes in the aggregate;
    generating a persistent, point-in-time image (PPI) of the aggregate by creating a copy of the superblock, wherein the generation of the PPI of the aggregate causes a PPI to be automatically generated for each of the plurality of flexible volumes in the aggregate.

8. A method as recited in claim 7, further comprising:
    servicing one or more read requests and one or more write requests from a client, directed to data stored in the storage server.

9. A method as recited in claim 8, wherein the flexible volume is implemented using a write-out-of-place algorithm for modifying data.

10. A storage server, comprising:
    a processor;
    a communication interface through which to communicate with a set of clients;
    a storage interface through which to communicate with a storage subsystem containing data stored by the storage server on behalf of the set of clients; and
    logic which, during operation, causes the storage server to:
        maintain an aggregate of storage;
        maintain a plurality of storage volumes within the aggregate;
        maintain, in the aggregate, an independent file system for each of the plurality of storage volumes;
        maintain an inode file comprising a plurality of inodes associated with the plurality of storage volumes in the aggregate;
        store a reference to the inode file in a superblock; and
        generate a persistent, point-in-time image (PPI) of the aggregate by creating a copy of the superblock, wherein the generation of the PPI of the aggregate causes a PPI to be automatically generated for each of the plurality of storage volumes maintained in the aggregate.

11. A storage server as recited in claim 10, wherein each of the plurality of independent file systems is a flexible volume.

12. A storage server as recited in claim 10, further comprising logic which causes the storage server to:
    represent the aggregate as a file system; and
    represent each of the plurality of independent file systems as a container file within the file system.

13. A storage server as recited in claim 12, wherein the logic which, when, in operation, causes the storage server to concurrently generate a PPI of the plurality of independent file systems comprises:
    logic which, during operation, causes the storage server to generate a PPI of the file system which represents the aggregate.

14. A storage server as recited in claim 13, wherein the logic which, when, in operation, causes the storage server to generate a PPI of the plurality of independent file systems comprises logic which causes the storage server to:
    create a superblock for the file system, representing the aggregate, wherein, the superblock containing metadata of the corresponding file system, including metadata for locating the inode file of the corresponding file system.

15. A storage server comprising:
    means for maintaining a plurality of storage volumes in an aggregate;
    means for maintaining an independent file system for each of the plurality of storage volumes, wherein each independent file system includes a plurality of files;
    means for maintaining an inode file comprising a plurality of inodes associated with the plurality of storage volumes in the aggregate;

means for storing a reference of the inode file in a superblock; and means for generating a persistent, point-in-time image (PPI) of the aggregate by creating a copy of the superblock, wherein the generation of the PPI of the aggregate causes a PPI to be automatically generated for each of the plurality of storage volumes maintained in the aggregate.

16. A storage server as recited in claim 15, wherein a file system of the plurality of file systems is a flexible volume.

17. A storage server as recited in claim 16, wherein the flexible volume is contained within an aggregate of storage.

18. A storage server as recited in claim 17, further comprising:

means for representing the aggregate as a volume.

19. A storage server as recited in claim 18, further comprising:

means for representing the flexible volume as a container file within the volume which represents the aggregate.

20. A storage server as recited in claim 19, wherein the means for generating the PPI of the plurality of file systems in one atomic operation comprises means for generating a PPI of the aggregate.

* * * * *

UNITED STATES PATENT AND TRADEMARK OFFICE
CERTIFICATE OF CORRECTION

| | |
|---|---|
| PATENT NO. | : 7,664,791 B1 |
| APPLICATION NO. | : 11/260653 |
| DATED | : February 16, 2010 |
| INVENTOR(S) | : Eric C. Hamilton |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Twenty-eighth Day of December, 2010

David J. Kappos
*Director of the United States Patent and Trademark Office*